(12) United States Patent
Itoh et al.

(10) Patent No.: US 6,313,949 B1
(45) Date of Patent: Nov. 6, 2001

(54) FLY EYE LENS

(75) Inventors: Eiji Itoh; Yasuyuki Miyata, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/630,428

(22) Filed: Aug. 1, 2000

(30) Foreign Application Priority Data

Aug. 11, 1999 (JP) .................................................. 11-227665

(51) Int. Cl.[7] .............................. G02B 27/10; G02B 3/08; G02B 7/02
(52) U.S. Cl. .......................... 359/619; 359/741; 359/820
(58) Field of Search .................................... 359/619–620, 359/625–626, 628, 796, 811, 819–820, 741

(56) References Cited

U.S. PATENT DOCUMENTS 4,402,572 * 9/1983 Tsunoda et al. ..................... 359/623
4,884,869 * 12/1989 Uemura ................................ 359/641

FOREIGN PATENT DOCUMENTS 4-265919-A * 9/1992 (JP) .

* cited by examiner

Primary Examiner—Jordan M. Schwartz
(74) Attorney, Agent, or Firm—Leydig, Voit & Mayer, Ltd.

(57) ABSTRACT

A fly eye lens has cells in an optical functional portion, and first, second, and third positioning portions on an outer edge. The first and second positioning portions are located in a region of a plane normal to the optical axis of the lens, divided by a first reference line extending through a center of thermal expansion and located in the plane. The first and second positioning portions have side surfaces located on the first reference line. The third positioning portion has a side surface located on a second reference line intersecting the first reference line, extending through the center of thermal expansion, and located in the plane. Even when the fly eye lens thermally expands, the position of the center of thermal expansion does not change in an optical system, and desired optical performance can be continuously achieved.

4 Claims, 3 Drawing Sheets

FLY EYE LENS

BACKGROUND OF THE INVENTION

1. Field of the Invention

The present invention relates to a plastic fly eye lens used in an optical system such as a liquid crystal projector.

2. Related Background Art

As conventional fly eye lenses, fly eye lenses B and C, employed in a pair in a housing A of an optical system such as a liquid crystal projector are known, as shown in FIG. 5. These fly eye lenses B and C respectively have pluralities of cells $E_B$ and $E_C$, and light from a light source can uniformly irradiate a target object with the optical function of the cells $E_B$ and $E_C$.

The fly eye lenses B and C are fitted in the housing A, fixed with retainers H extending through the housing A with their outer edge portions abutting against projections F projecting on the inner surface of the housing A, and are positioned such that their lens surfaces perpendicularly intersect an optical axis Z of this optical system. In this state, when a lamp D emits light, this light is focused in units of cells $E_B$ of the fly eye lens B. The focused light is then received and enlarged in units of cells $E_C$ of the fly eye lens C that correspond to the cells $E_B$ in one-to-one correspondence. The light thus irradiates a target optical system G as uniform light.

In this conventional optical system, the interior of the optical system is heated to a high temperature of 150° C. or more by irradiation with the lamp D. The housing A and fly eye lenses B and C thus thermally expand, so desired optical performance cannot be obtained.

For example, when the coefficient of thermal expansion of the housing A is larger than that of the fly eye lenses B and C, the housing A becomes larger with respect to the fly eye lenses B and C. Then, a gap is formed between the inner wall of the housing A and the outer edges of the fly eye lenses B and C, and the centers of the fly eye lenses B and C are shifted from the optical axis Z. In this case, the centers of the two fly eye lenses B and C are also shifted from each other, and the optical performance may undesirably, largely degrade.

When the coefficient of thermal expansion of the housing A is smaller than that of the fly eye lenses B and C, the fly eye lenses B and C become larger with respect to the housing A. Thus, the fly eye lenses B and C are to expand by pushing the inner wall of the housing A. Therefore, the fly eye lenses B and C may be distorted, leading to degrading optical performance.

As a countermeasure for this inconvenience, a glass plate I coated with an anti-reflecting coating may be interposed as a heat-insulating member between the lamp D and fly eye lens B, as shown in FIG. 6. However, as heat of the lamp D is conducted through the housing A and the like, thermal expansion of the housing A and fly eye lenses B and C cannot be prevented effectively.

SUMMARY OF THE INVENTION

The present invention has been made in view of the above problems, and has as its object to provide a fly eye lens which can obtain desired optical performance even if it thermally expands.

More specifically, according to the present invention, there is provided a fly eye lens with a plurality of cells at an optical functional portion thereof, characterized by having first, second, and third positioning portions on an outer edge thereof, wherein the first and second positioning portions are formed on one of regions of a plane normal to the optical axis of the lens, and divided by a first reference line extending through a center of thermal expansion located on the plane of the lens, the first and second positioning portions having end portions located on the first reference line, and the third positioning portion has an end portion located on a second reference line crossing the first reference line and extending through the center of thermal expansion located on the plane of the lens.

According to the present invention, the fly eye lens is positioned with respect to an optical system by using the end portions of the first, second, and third positioning portions. Even when the fly eye lens thermally expands, the end portions of its first and second positioning portions can be positioned on the first reference line and the end portion of its third positioning portion can be positioned on the second reference line. Therefore, when the fly eye lens thermally expands, the center of its thermal expansion can be prevented from moving with respect to the optical system, and degradation in optical function resulted from movement of the fly eye lens can be prevented.

The fly eye lens according to the present invention can be characterized in that the first, second, and third positioning portions described above are projections projecting from the outer edge of the fly eye lens, or recesses formed by recessing the outer edge of the fly eye lens. When the respective positioning portions are formed in this manner, in addition to the function and effect described above, a gap through which heat in the optical system is discharged can be ensured easily.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
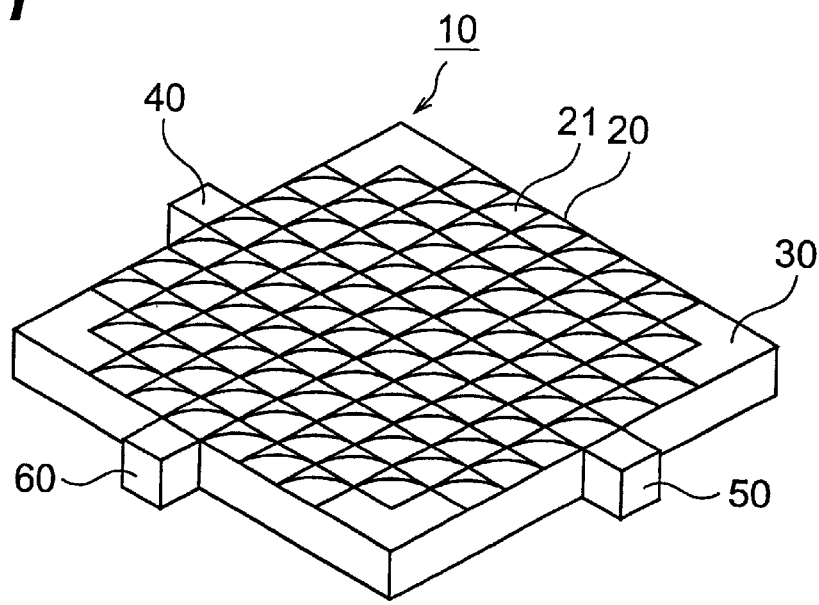
FIG. 1 is a perspective view showing a fly eye lens according to a preferred embodiment of the present invention.

A fly eye lens according to a preferred embodiment of the present invention will be described in detail with reference to the accompanying drawings. In the following description, portions that are identical or equivalent to each other are denoted by the same reference numerals, and a repetitive description thereof will be omitted.

FIG. 1 is a perspective view showing a fly eye lens according to a preferred embodiment of the present invention. As shown in FIG. 1, a fly eye lens 10 according to this embodiment in a rectangular plate and is made of a resin. An optical functional portion 20 is formed at the center of one surface of the fly eye lens 10, and corner portions 30 are formed around the optical functional portion 20. A plurality of cells 21 are formed in the optical functional portion 20. The cells 21 serve as optical convex lenses, and are arranged in a matrix.

First, second, and third positioning portions 40, 50, and 60 which form prismatic projections project from the outer edge of the fly eye lens 10.

Figure 2:
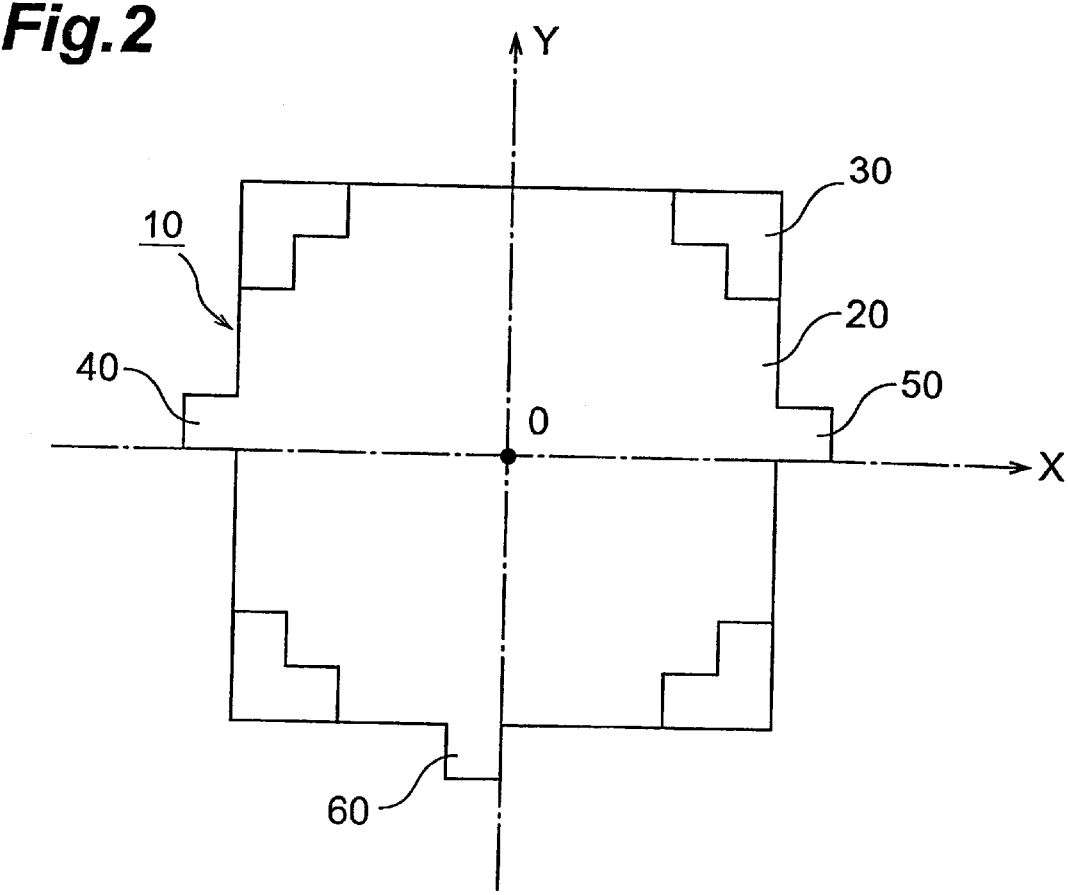
FIG. 2 is a front view of the fly eye lens shown in FIG. 1.

FIG. 2 is a front view for explaining the arrangement of the first, second, and third positioning portions 40, 50, and 60 of the fly eye lens 10 shown in FIG. 1.

The first positioning portion 40 is disposed on one side of the rectangular outer edge of the fly eye lens 10, and the second positioning portion 50 is disposed on an opposite side to face the first positioning portion 40. The third positioning portion 60 is disposed on one remaining side of the outer edge where the first and second positioning portions 40 and 50 are not disposed.

The positioning portions 40 to 60 will be described in detail. The first and second positioning portions 40 and 50 are located in one of regions of a plane normal to the optical axis of the fly eye lens 10. The regions are divided by a first reference line X extending through the center O of thermal expansion. The side surface of the first and second positioning portions 40 and 50 are located on the first reference line X. The "center of thermal expansion" refers to a position serving as the center when the fly eye lens 10 thermally expands. The fly eye lens 10 is preferably formed such that the center O of thermal expansion and the geometric barycenter of the fly eye lens 10 coincide with each other. The first reference line X is a straight line extending through the center O of thermal expansion of the fly eye lens 10.

A side surface of the third positioning portion 60 is located on a second reference line Y perpendicular to the first reference line X and extending through the center O of thermal expansion. Therefore, even when the fly eye lens 10 thermally expands, the center O of thermal expansion along the second reference line Y does not shift with respect to the first and second positioning portions 40 and 50. Also, the center O of thermal expansion along the first reference line X does not shift with respect to the third positioning portion 60.

The fly eye lens 10 can be fabricated highly precisely by injection molding or press molding of a plastic material.

Figure 3:
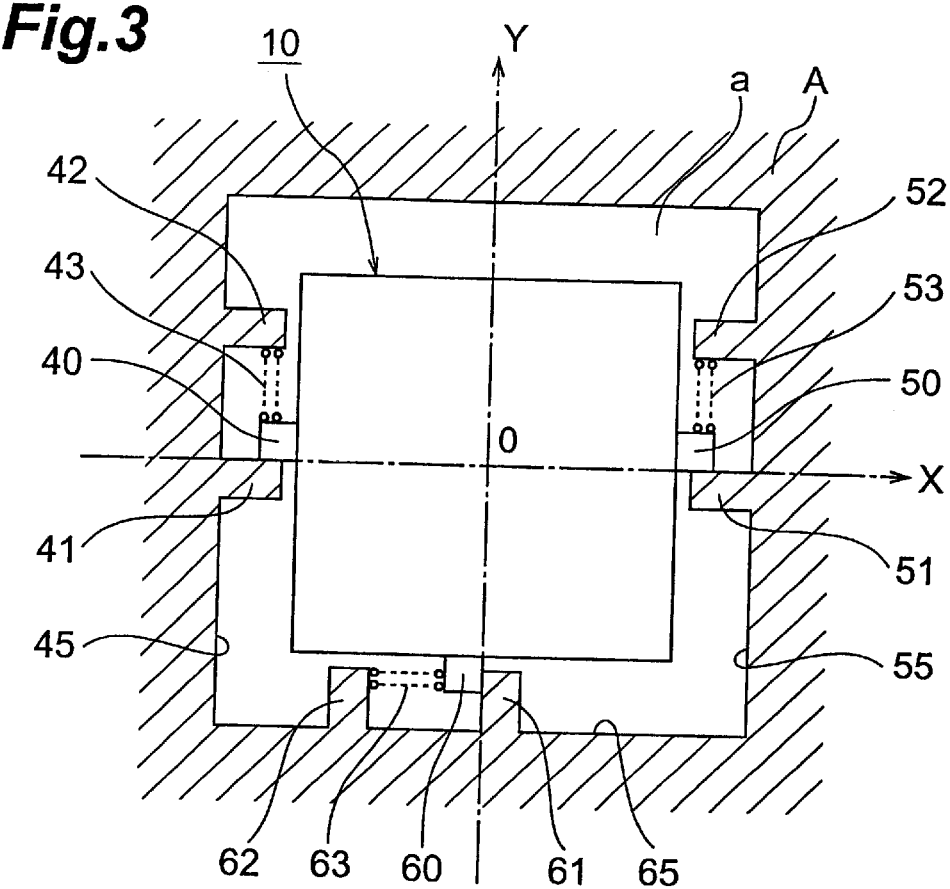
FIG. 3 is a front view showing the practical arrangement in an optical system of the fly eye lens shown in FIG. 1.

FIG. 3 is a sectional view of a practical arrangement obtained when the fly eye lens 10 of FIG. 1 is disposed in the housing A.

As shown in FIG. 3, a hollow portion a is formed in the housing A. The hollow portion a is a space where optical component such as the fly eye lens 10 is to be arranged, and has, e.g., a rectangular section. A projection 41 projects from a side surface 45 of the hollow portion a. A projection 51 projects from a side surface 55 opposing the side surface 45, to face the projection 41.

The projections 41 and 51 serve as abutting members with upper end portions against which the first positioning portions 40 and 50 are to abut. A projection 61 projects from a floor surface 65. The projection 61 serves as an abutting member with a side portion against which the side portion of the third positioning portion 60 of the fly eye lens 10 is to abut.

The first reference line X of the fly eye lens 10 is positioned with respect to this housing A by the first positioning portion 40, the abutting surface of the projection 41, the second positioning portion 50, and the abutting surface of the projection 51. The second reference line Y of the fly eye lens 10 is positioned by the third positioning portion 60 and the abutting surface of the projection 61. With this arrangement, the position of the center O of thermal expansion of the fly eye lens 10 is positioned with respect to the housing A.

When the positions of the projections 41, 51, and 61 are appropriately adjusted, the positions of an optical axis Z (not shown) of the optical system and the center O of thermal expansion of the fly eye lens 10 relative to each other can be determined easily if necessary, so that the optical axis Z (not shown) of the optical system and the center O of thermal expansion of the fly eye lens 10 can be set to coincide with each other.

A projection 42 projects above the projection 41 from the side surface 45, and a spring 43 is provided to the lower end portion of the projection 42. The spring 43 depresses from above the first positioning portion 40 of the fly eye lens 10 abutted by the projection 41, thereby maintaining the abutting state. Similarly, a projection 52 projects above the projection 51 from the side surface 55, and a spring 53 is provided to the lower end portion of the projection 52. The spring 53 depresses from above the second positioning portion 50 of the fly eye lens 10 abutted by the projection 51, thereby maintaining the abutting state.

A projection 62 projects from the floor surface 65 at a side opposite to the projection 61 with respect to the third positioning portion 60 of the fly eye lens 10, and a spring 63 is provided to the side portion, on the third positioning portion 60 side, of the projection 62. The spring 63 depresses laterally the third positioning portion 60 of the fly eye lens 10 abutted by the projection 61, thereby maintaining the abutting state.

The sizes of the respective positioning portions of the fly eye lens 10 and of the respective projections of the housing A are set by considering the differences among their coefficients of thermal expansion. As shown in FIG. 3, predetermined gaps are formed between the distal end portions of the respective positioning portions and the respective opposing side surfaces of the hollow portion a, and between the distal end portions of the respective projections and the opposing outer edge of the fly eye lens 10.

In the state shown in FIG. 3, even when the interior in the housing A is heated to a high temperature and the fly eye lens 10 thermally expands centered on the center O of thermal expansion, the first positioning portion 40 is depressed and supported by the projection 41, and the second positioning portion 50 is supported as it is depressed by the projection 51. Therefore, the fly eye lens 10 can be supported while allowing the first and second positioning portions 40 and 50 to move along the second reference line Y.

Since the third positioning portion 60 is depressed and supported by the projection 61, the fly eye lens 10 can be supported while allowing the third positioning portion 60 to move along the second reference line Y.

Furthermore, gaps are formed between the distal ends of the second and third positioning portions 50 and 60 and the inner wall of the housing A, and between the distal ends of the projections 41, 51, and 61 and the outer edge of the fly eye lens 10. Therefore, deformation of the fly eye lens 10, which occurs when the distal ends of the first, second, and third positioning portions 40, 50, and 60 and the inner wall of the housing A, and the distal ends of the projections 41, 51, and 61 and the outer edge of the fly eye lens 10, come into contact with each other, can be prevented.

In the state shown in FIG. 3, even when the interior of the housing A is heated to a high temperature and the fly eye lens 10 thermally expands centered on the center O of thermal expansion, the first reference line X determined by the first positioning portion 40 of the fly eye lens 10 and the projection 41, and the second positioning portion 50 of the fly eye lens 10 and the projection 51 does not move along the second reference line Y. Therefore, the center O of thermal expansion of the fly eye lens 10 can be prevented from being shifted in the housing A along the second reference line Y.

The second reference line Y determined by the third positioning portion 60 of the fly eye lens 10 and the projection 61 does not move along the first reference line X. Therefore, the center O of thermal expansion of the fly eye lens 10 can be prevented from being shifted in the housing A along the first reference line X.

Hence, even if the interior of the housing A is heated to a high temperature and the fly eye lens 10 thermally expands centered on the center O of thermal expansion, movement of the center O of thermal expansion of the fly eye lens 10 with respect to the housing A can be prevented. If the center O of thermal expansion and the optical axis Z of the optical system are aligned in advance, the shift between them can be prevented even under conditions with which thermal expansion occurs.

Due to the arrangements of the projections of the fly eye lens 10 and housing A, a large gap, which cannot be conventionally obtained, can be ensured between the fly eye lens 10 and housing A, as shown in FIG. 3, and this gap can be used as a good heat dissipation path. The good heat dissipating function of the arrangement itself, which is produced by the combination of the fly eye lens 10 and housing A, also contributes to preventing degradation in optical function caused by thermal expansion.

How to use the fly eye lens 10 in an optical system such as a liquid crystal projector will be described with reference to FIG. 3.

As a housing A where the fly eye lens 10 is disposed, one having projections 41, 42, 51, 52, 61, and 62 for positioning two fly eye lenses 10, that are formed such that the center of the housing A and an optical axis Z (not shown) of this optical system coincide with each other, is used. The fly eye lenses 10 are arranged such that their centers O of thermal expansion and the optical axis Z of the optical system coincide with each other. These fly eye lenses 10 are arranged at a predetermined gap such that they can exhibit desired optical performance.

For each fly eye lens 10, its first positioning portion 40 is depressed against the projection 41 by the spring 43, the second positioning portion 50 is depressed against the projection 51 by the spring 53, and the third positioning portion 60 is depressed against the projection 61 by the spring 63. Hence, the respective fly eye lenses 10 are positioned with reference to the first and second reference lines X and Y.

In this state, when a lamp (not shown) arranged near one fly eye lens 10 emits light, the emitted light propagates through the fly eye lenses 10. In this case, the housing A and the two fly eye lenses 10 thermally expand by heat emitted from the lamp.

However, the two fly eye lenses 10 positioned in the housing A thermally expand centered on the centers O of thermal expansion, while maintaining the abutting state of each positioning portion and with the positions of their centers O of thermal expansion being kept immobile. Therefore, the positions of the plurality of cells of the first fly eye lens 10, seen from the optical axis of the optical system, relative to the positions of the plurality of cells of the second fly eye lens 10 which optically form pairs with the cells on the first fly eye lens 10 in units of cells, are kept unchanged even when thermal expansion occurs.

More specifically, since the first and second fly eye lenses 10 are held with the optical axes of their cells which form the pairs being aligned with each other, uniform radiation can be ideally, continuously performed. If the center of thermal expansion of the fly eye lens 10 and the optical axis Z of the optical system are aligned with each other in advance, the positions of all the cells on the two fly eye lenses relative to each other can be held with respect to the optical axis Z as well. Therefore, these fly eye lenses 10 can be used also in applications where strict conditions are required for the arrangement of the optical system.

Figure 4:
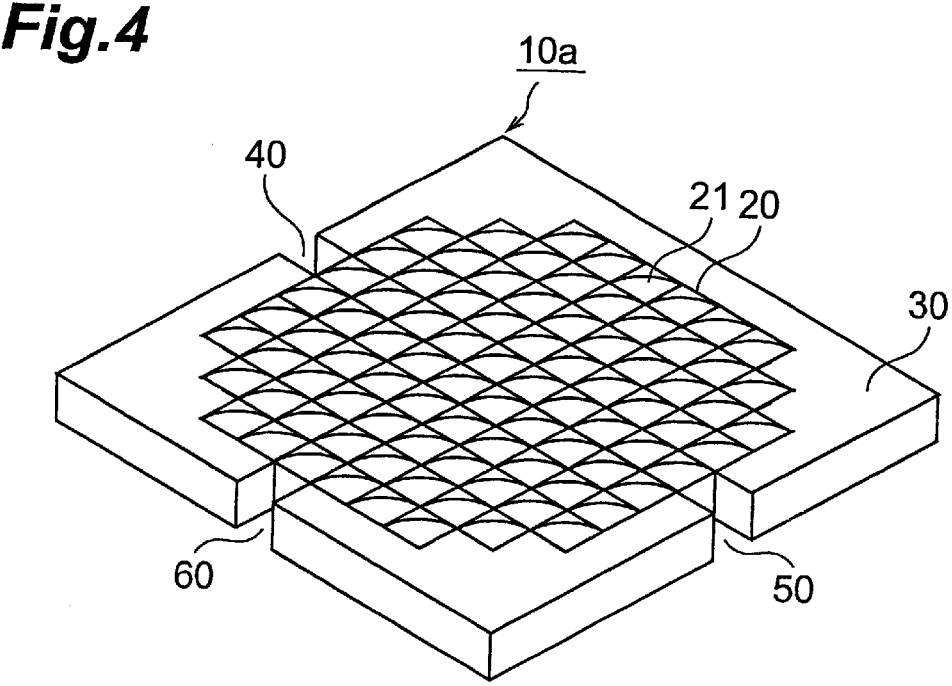
FIG. 4 is a perspective view showing a fly eye lens according to another embodiment of the present invention.
Figure 5:
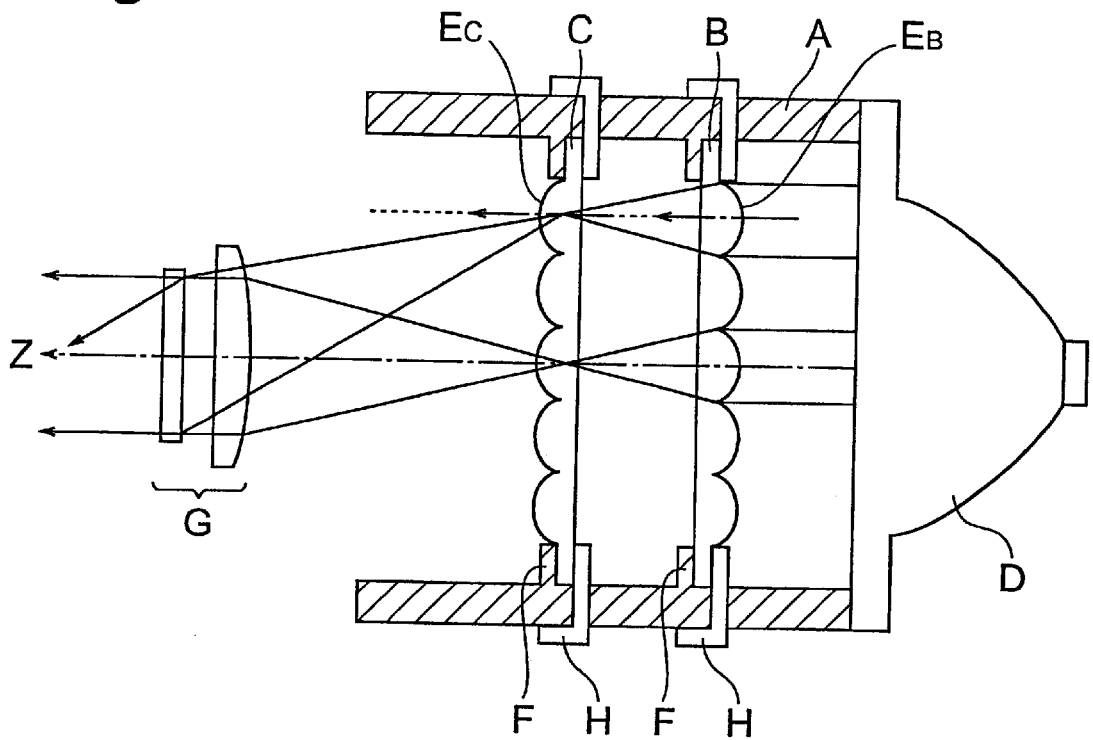
FIG. 5 is a sectional view showing the basic arrangement of an optical system using conventional fly eye lenses.
Figure 6:
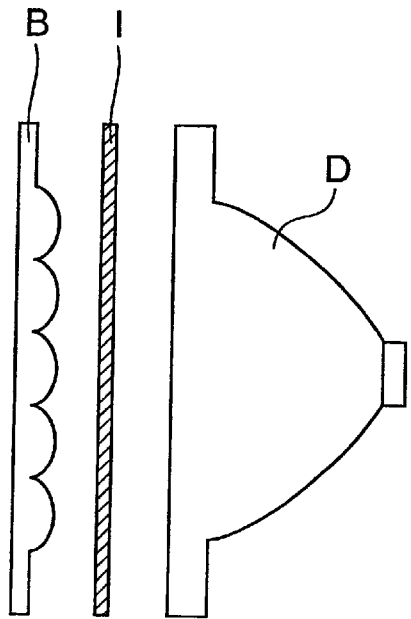
FIG. 6 is a sectional view showing the basic arrangement of another optical system using conventional fly eye lens.

FIG. 4 is a perspective view showing another practical arrangement of a fly eye lens.

In the fly eye lens 10 described above, the respective positioning portions are projections projecting from the outer edge of the fly eye lens 10. In contrast to this, in a fly eye lens 10a shown in FIG. 4, its respective positioning portions are recessed from its outer edge. Even with this arrangement, when this fly eye lens 10a is positioned by first, second, and third positioning portions 40, 50, and 60, the position of the center O of its thermal expansion is kept unchanged during thermal expansion, and the fly eye lens 10a can exhibit desired optical performance.

The center O of thermal expansion is not limited to the geometric barycenter of the fly eye lens 10 or 10a, but can be an arbitrary point where the first and second reference lines X and Y determined by the first, second, and third positioning portions 40, 50, and 60 perpendicularly intersect each other. In this case as well, when the fly eye lens 10 or 10a disposed in an optical system thermally expands, its center O of thermal expansion does not move with respect to the optical system. Therefore, desired optical performance can be obtained.

The preferred embodiment of the present invention has been described. Note that the present invention is not limited to the above embodiment. For example, the fly eye lens according to the present invention is not limited for use in a liquid crystal projector, but can be used in other optical systems.

In the fly eye lens described above, the first and second reference lines X and Y perpendicularly intersect each other. However, in the fly eye lens according to the present invention, the first and second reference lines X and Y need not perpendicularly intersect each other as far as they cross each other. In this case as well, the same function and effect as those obtained with the fly eye lens 10 or 10a described above can be obtained. More specifically, when the fly eye lens is thermally expands, its movement on the first reference line along the second reference line is prevented, and its movement on the second reference line along the first reference line is prevented. As a result, movement of the center of thermal expansion, where the first and second reference lines cross each other, can be prevented reliably.

As has been described above, according to the present invention, a fly eye lens is positioned with respect to an optical system by using the end portions of the first, second, and third positioning portions. Even when the fly eye lens thermally expands, the end portions of its first and second positioning portions can be positioned on the first reference line, and the end portion of its third positioning portion can be positioned on the second reference line. Therefore, movement of the center of thermal expansion of the fly eye lens with respect to the optical system, which is caused by thermal expansion of the fly eye lens can be prevented, and degradation in optical function resulted from movement of the fly eye lens can be prevented.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fly eye lens comprising:

a plurality of cells in an optical functional portion having an optical axis; and first, second, and third positioning portions on outer edges of said optical functional portion wherein said first and second positioning portions are located in one region of a plane normal to the optical axis of said fly eye lens and divided into two regions by a first reference line extending through a center of thermal expansion of said fly eye lens and located in the plane, said first and second positioning portions having side surfaces located on the first reference line, and said third positioning portion has a side surface located on a second reference line intersecting the first reference line and extending through the center of thermal expansion located in the plane.

2. The lens according to claim 1, wherein said first, second, and third positioning portions are projections projecting from said outer edge.

3. The lens according to claim 1, wherein said first, second and third positioning portions are recesses in said outer edge.

4. The lens according to claim 1, wherein the outer edge is rectangular and has four sides and the first and second positioning portions are located on opposite sides of the rectangular outer edge and the third positioning portion is located on a side of the rectangular outer edge different from the first and second positioning portions.

* * * * *